United States Patent
Gaillard et al.

(10) Patent No.: US 7,048,530 B2
(45) Date of Patent: May 23, 2006

(54) DEVICE FOR APPLYING THIN LAYERS OF A POWDER OR PULVERULENT MATERIAL AND CORRESPONDING METHOD

(75) Inventors: Jean-Marie Gaillard, Limoges (FR); Arnaud Hory, Limoges (FR)

(73) Assignee: Ecole Nationale Superieure de Ceramique Industrielle (E.N.S.C.I.), Limoges (FR)

(*) Notice: Subject to any disclaimer, the term of this patent is extended or adjusted under 35 U.S.C. 154(b) by 172 days.

(21) Appl. No.: 10/149,126

(22) PCT Filed: Dec. 8, 2000

(86) PCT No.: PCT/FR00/03448

§ 371 (c)(1),
(2), (4) Date: Oct. 18, 2002

(87) PCT Pub. No.: WO01/41939

PCT Pub. Date: Jun. 14, 2001

(65) Prior Publication Data
US 2003/0059492 A1 Mar. 27, 2003

(30) Foreign Application Priority Data
Dec. 10, 1999 (FR) .................................. 99 15620

(51) Int. Cl.
*B29C 31/06* (2006.01)
(52) U.S. Cl. .................... 425/258; 425/260; 425/281; 425/409; 425/448
(58) Field of Classification Search ........ 425/258–260, 425/281, 336, 364 R, 409, 415, 448; 404/101–103
See application file for complete search history.

(56) References Cited

U.S. PATENT DOCUMENTS

| | | | | |
|---|---|---|---|---|
| 2,913,753 A | * | 11/1959 | Peterson | 15/245.1 |
| 4,437,828 A | * | 3/1984 | Egger | 425/458 |
| 4,507,015 A | * | 3/1985 | Furukawa et al. | 425/456 |
| 4,734,022 A | * | 3/1988 | Shimabukuro | 425/62 |
| 4,966,490 A | * | 10/1990 | Hodson | 404/103 |
| 5,379,479 A | * | 1/1995 | Nelson | 15/245.1 |
| 5,606,763 A | * | 3/1997 | South et al. | 15/245.1 |
| 6,200,525 B1 | * | 3/2001 | Bequette | 425/448 |
| 6,308,370 B1 | * | 10/2001 | Southby | 15/245.1 |
| 6,531,086 B1 | * | 3/2003 | Larsson | 425/218 |

FOREIGN PATENT DOCUMENTS

DE 43 25 573 A 2/1995

* cited by examiner

*Primary Examiner*—Duane Smith
*Assistant Examiner*—Thu Khanh T. Nguyen
(74) *Attorney, Agent, or Firm*—Young & Thompson

(57) ABSTRACT

A device for applying a thin layer of a powder on a support means (14) includes a device (12) for storing the powder, a screed (30) that includes a shoe (36) with a working surface, as well as a device (28) for guiding in translation in a direction of movement F. The shoe (36) is rotatable and includes a device (32, 34) for inclining the to take at least two positions, the first in which the working surface is parallel to the support (14) for the layers to take up a predetermined volume of powder and a second in which this working surface is inclined at an angle α relative to the support.

15 Claims, 4 Drawing Sheets

DEVICE FOR APPLYING THIN LAYERS OF A POWDER OR PULVERULENT MATERIAL AND CORRESPONDING METHOD

BACKGROUND OF THE INVENTION

The present invention relates to a device for applying thin layers of powder or pulverulent material, particularly for applying successive layers in machines for a rapid prototyping.

The invention also relates to a process for laying down a layer with this device.

There is known from the patent application PCT FR 99/00357 a process for rapid prototyping by laser sintering, which permits obtaining ceramic pieces of complex shapes from a three-dimensional image, by sintering superposed layers of powder with the help of a laser.

Such a process requires the performance of steps of which one consists in spreading in the form of a thin layer the powder or mixture of powders and compacting this powder to increase its density.

The thickness of such layers is of the order of several tens to several hundreds of microns.

The means for forming the layers described above comprise a screed which permits transferring the powder contained in a first container toward the laser working zone with a suitable and constant thickness.

If such an arrangement produces satisfactory results during the use of most powders, there is a need to improve the formation of layers when the powders are more delicate to handle and above all when the granulometry of the powders decreases, when the ratio of the thickness of the layer and the granulometry varies, or else when the shape of the particles changes.

The document DE 4325573 describes a device for applying a layer of powder stored in a supply and spread on a support. This latter comprises screed means in the form of a slider that moves by jacks.

Also, at present, to permit the production of such layers, the powder is often selected as a function of needs, which is a constraint because it is necessary to crush precisely and classify the powders by classes of granulometry. Such an undertaking requires sophisticated means given the diameters of the grains.

Thus, to produce homogeneous layers, it is necessary to work with powders having a Theological behavior substantially identical to that of liquids, which is the case for example of atomized powders whose particles are substantially spherical and of a diameter of little variation.

Such a preparation is costly and above all leads to unacceptable requirements for industry.

When the powders used are of the flour type, which is to say they swell, it becomes very difficult or even impossible to produce homogeneous layers.

In the case of swelling powders, when the layers are less than 100 μm, the screed totally moves the powder, zonewise, which creates impermissible defects to produce quality finished pieces by rapid prototyping.

Such a problem arises in the use of rapid prototyping but it generally is present when it is desired to lay down thin layers of swelling powders.

SUMMARY OF THE INVENTION

The object of the present invention is to provide a device for laying down a layer which will be simple, effective and including and above all for swelling powders, which can be mounted on any machine meeting the same and by replacing certain devices in use at present.

To this end, according to the present invention, the device for applying in a thin layer a powder on support means, comprising means for storing the powder, screed means with a screed comprising a shoe with a working surface as well as means for guiding in translation along a direction of movement F, is characterized in that the shoe is movable in rotation and comprises means for inclining it to take at least two positions, the first in which the working surface is parallel to the support means for the layers for the laying down of a predetermined volume of powder, and a second in which this working surface is inclined at an angle a relative to said support means.

According to another characteristic, the working surface of the shoe comprises an obstacle, with several indentations.

More particularly, the indentations are three in number and have a triangular/rectangular transverse cross-section with the right angle in the plane of the working surface and to the rear relative to the direction of movement F.

According to characteristics of the invention, the number of passages is determined as a function of the thickness of the layer and of the granulometry of the powder, by a non-linear decreasing law of the type $y=(ax+b)/(cx+d)$.

BRIEF DESCRIPTION OF THE DRAWINGS

The device according to the present invention will now be described in detail with respect to the accompanying drawings, in which the different figures represent.

DESCRIPTION OF THE PREFERRED EMBODIMENTS

Figure 1:
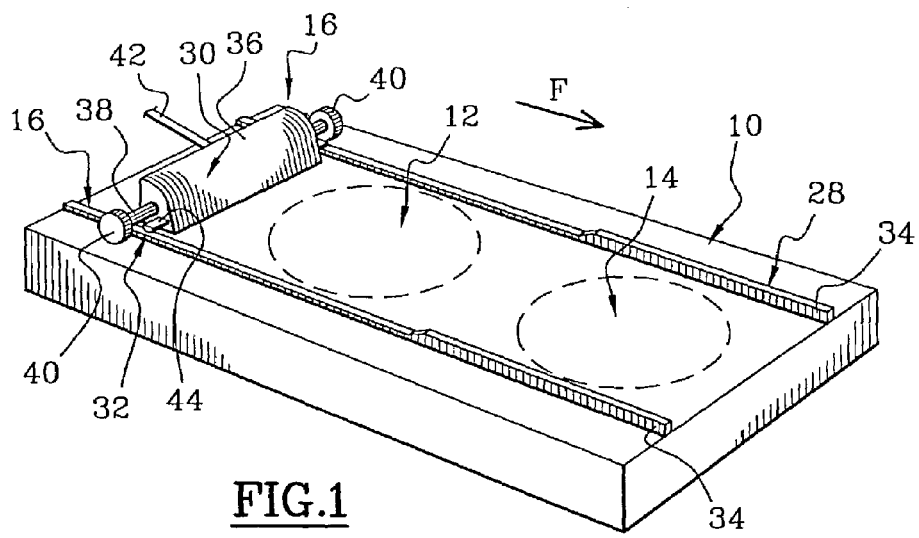
FIG. 1, a schematic perspective view of an installation including a device for applying thin layers according to the present invention, FIG. 2, a view in longitudinal cross-section, along the axis of the movement, of the device according to the present invention, FIGS. 3A to 3F, views in cross-section in the course of a complete synopsis of the operation of the device for applying layers according to the present invention, and FIGS. 4A, 4B and 4C, views respectively from the top, the front and the inside elevation, of a preferred embodiment of a screed.

In FIG. 1, there is shown an installation which includes a device according to the present invention. This installation comprises a frame 10, means 12 for storage and supply of powder, means 14 for supporting thin layers and means 16 for screeding and applying a thin layer.

The storage means 12 comprise a well 18 containing the powder and provided with an internal piston 20, movable particularly in translation, which permits raising the upper level 22 of the powder relative to the frame, with very great precision.

The support means 14 for the thin layers of this installation, given by way of example, also comprise a well 24 permitting retracting a piston 26, movable vertically in translation in said well. The movements must also be very precise.

The screed means 16, movable in translation on guide means 28, comprise a screed 30 and follower means 32.

The guide means 28 are comprised by two rails 34 which have a first height h over a length $L_1$ and a height H over a length $L_2$ with a transition zone L.

The length $L_1$ is substantially in line with the storage well and the length $L_2$ is substantially in line with the thin layer support.

The means for inclining and guiding which will be described are mechanical means which have the advantage of being able to work in aggressive environments or even at elevated or even high temperature.

The screed 30 comprises a shoe 36, movable in rotation freely about an axle 38 provided with rollers 40 in the present embodiment.

The rollers have diameters such that they roll on the frame thereby permitting having a reference.

This screed is moved in translation in the direction of movement indicated by the arrow F, which is parallel to the rails, thanks to any suitable means, these means not being shown for simplicity of the drawing, only the pushing rod 42 being shown, this rod bearing on the axle so as not to disturb pivoting.

The dimensions of this screed are such that it is positioned between the two rails in the transverse direction. As to its weight, it must be sufficient to ensure regular rolling in the working plane.

Two lugs 44 project laterally, to be disposed immediately above the rails, sliding on these latter.

The screed is thus suspended at its rear by its axle 38 provided with rollers 40 resting on the frame and at the front by the lugs 44.

The lugs 44 preferably have a profile conjugated with that of the rails so as to follow as closely as possible the profile of these rails and particularly to mount the transition zone L progressively.

The shoe 36 has a particular shape and in the preferred embodiment, it has a substantially triangular rectangular cross-section, thereby defining a front wall 46 which is substantially the hypotenuse with an acute attack angle, a rear vertical surface 48 which is one of the sides of the right angle and a working surface 50 which is the remaining side. The right angle is located immediately adjacent the frame and to the rear of the shoe relative to the direction of movement indicated by the arrow F.

According to the present invention, the working surface 50 also has particularities. This surface comprises at least one obstacle 52 which prevents this surface from being completely smooth and flat. This obstacle permits collection of the powder and an application or even a compacting, regular and homogeneous, by decreasing the compression constant.

Figure 2:
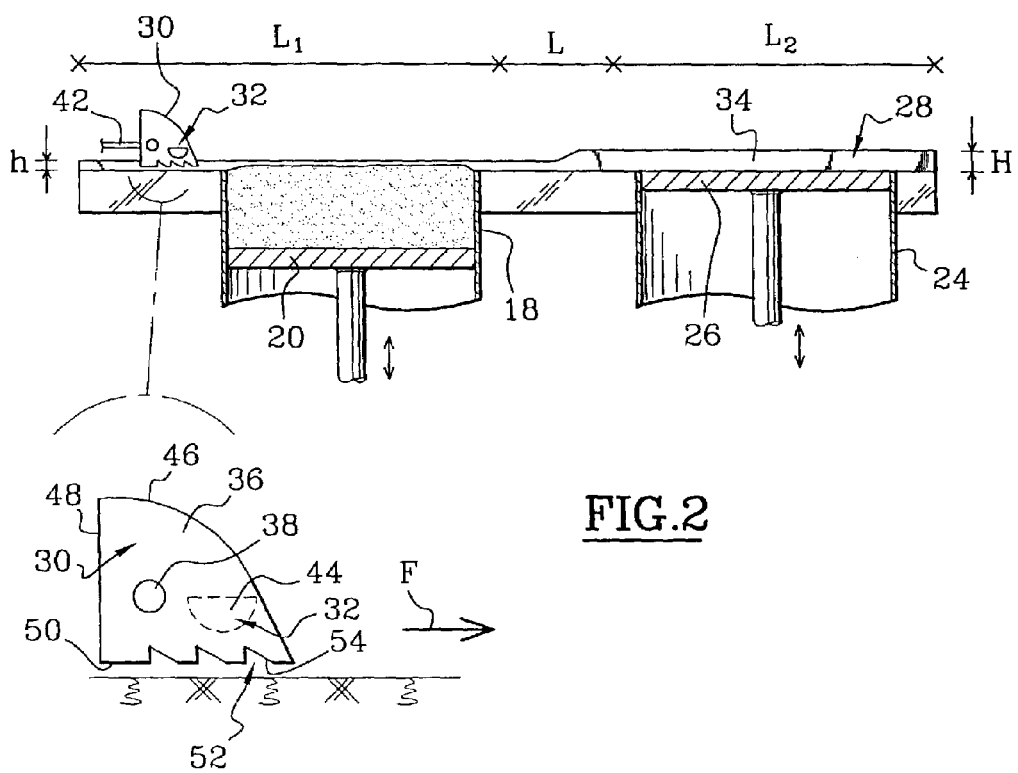

In the enlarged view of FIG. 2, this obstacle comprises indentations 54, in this instance three in number, also having a triangular/rectangular transverse cross-section, in accordance with the shoe 36 of the screed 30. The right angle of each indentation is in the plane of the working surface 50 and to the rear with respect to the direction of movement F.

The operation of the device for forming a thin layer according to the present invention will now be described in detail from the synopsis of FIGS. 3A to 3F, the reference numerals being identical to those in FIGS. 1 and 2.

Figure 3A:
Figure 3B:
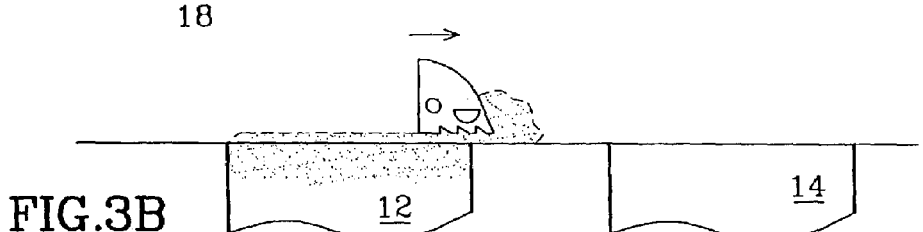
Figure 3C:
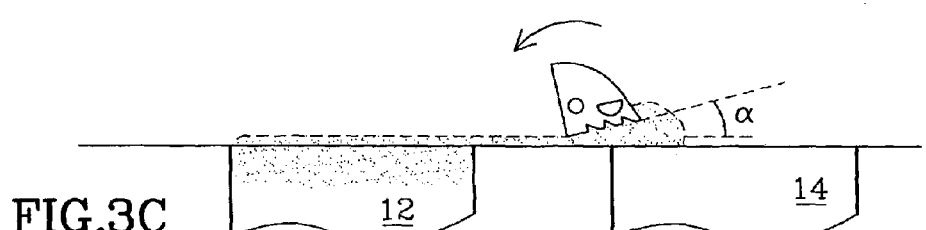

The initial position is shown in FIG. 3A. The shoe is upstream of the well 18 of the storage means 12 and the powder is pressed by the piston 20 to move as shown, above the working plane, to a height relative to the working plane of the frame, greater than the distance which separates the working surface 50 of the shoe from this same working plane.

The shoe is then moved in the direction F, as shown in step 3B. During this movement, the working surface 50 remains parallel to the working plane because the lugs 44 slide on the rails, in the portion $L_1$, at a height h. The front surface 46 pushes the powder and ensures taking up a given volume as a function of the height of the powder and of the relative position of the shoe. This volume is transferred to the right of the well 24 comprising the support means for the thin layer. It is then necessary to ensure a spreading of this powder over a very thin layer while avoiding any loss.

To this end, the shoe is inclined by an angle relative to the working plane. This inclination is obtained by the lugs 44 which, sliding on the rails 34, raise the front of the shoe and ensure its pivoting about the axle 38.

This shoe being pivoted, the working surface is also inclined at the same angle α, which gives rise to several advantageous results. The first is taking up all of the powder because it necessarily forms a trough which facilitates the passage of the powder below the working surface.

The fact of having a slope facilitates the progression of the thin layer and hence the progressive compression of the powder. Thanks to the obstacles 52 which constitute indendations 54, the powder is compressed without sliding between the working surface and the working plane, because a shearing effect is produced.

As to compression, it will be seen also that the inclined surface generates, by decomposition of the vertical compressive force resulting from the weight of the shoe, a component in the driving direction according to the arrow F. This component participates in moving the powder, which is also favorable for forming a high quality thin layer.

It will also be noted that the thickness of the thin layer is that which remains after passage of the shoe. Once inclined, the shoe frees a space which is smaller than the initial space.

Figure 3D:
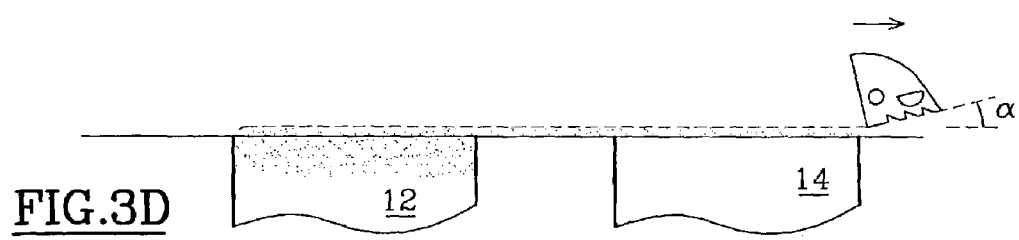

The shoe moves in the direction F, until the support 26 for the thin layer is passed, as shown in FIG. 3D.

Figure 3E:
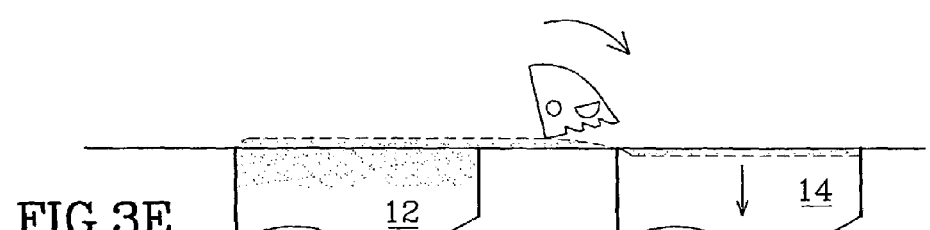
Figure 3F:
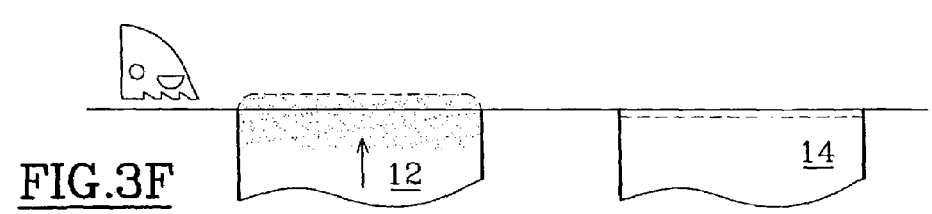
Figure 4A:
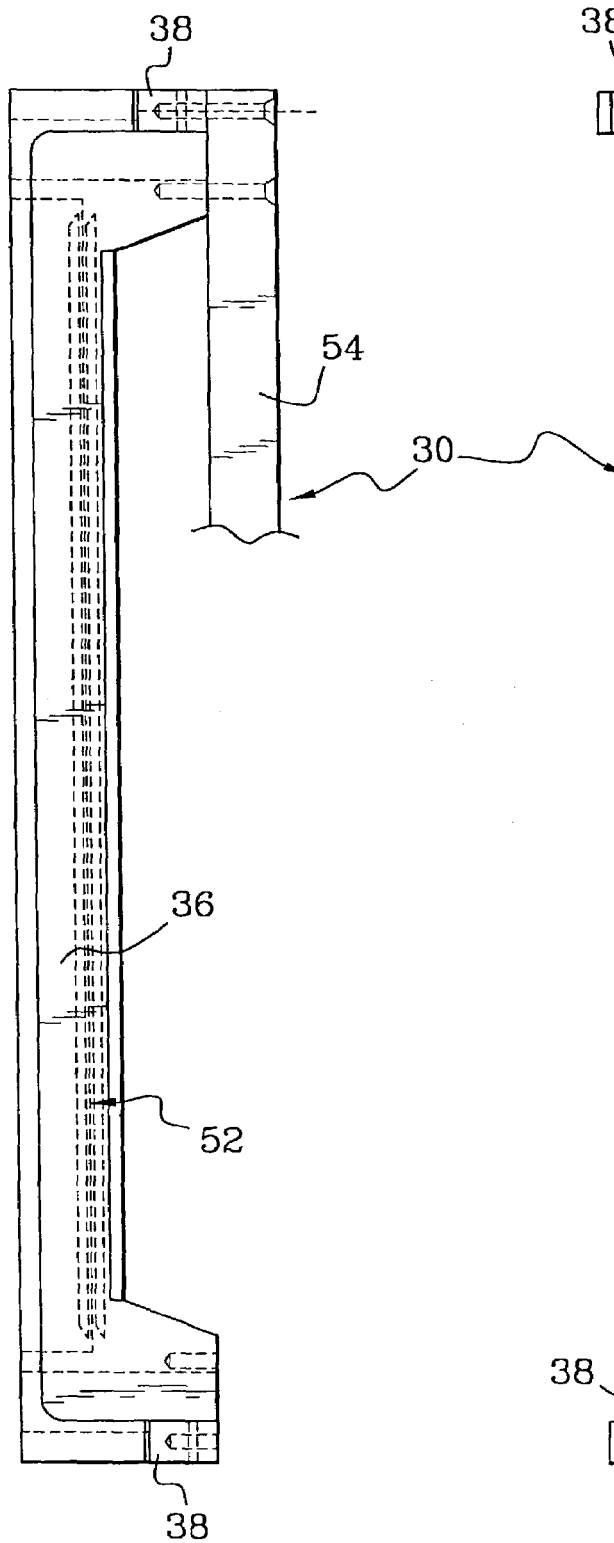
Figure 4B:
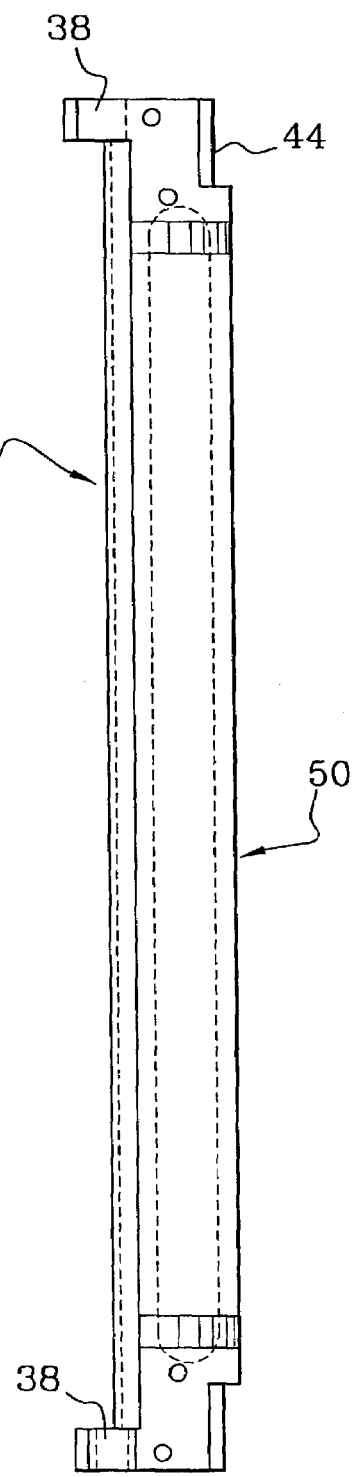
Figure 4C:
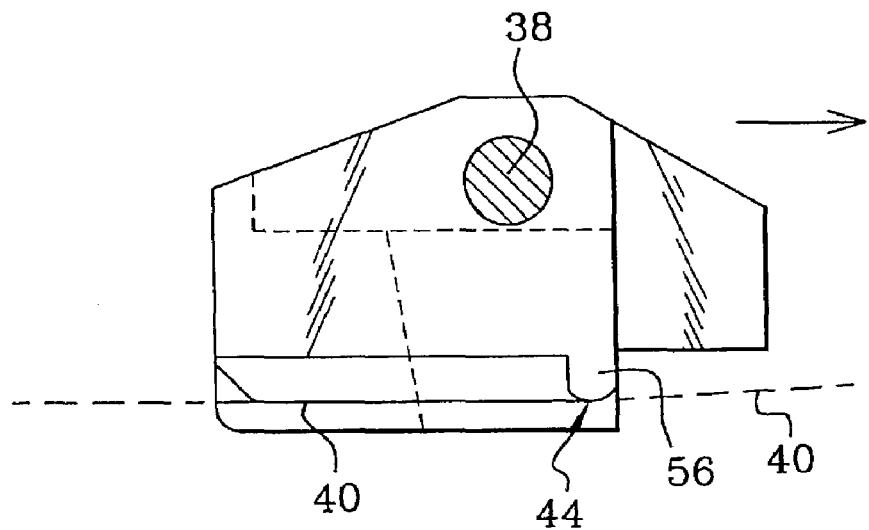
Figure 4D:
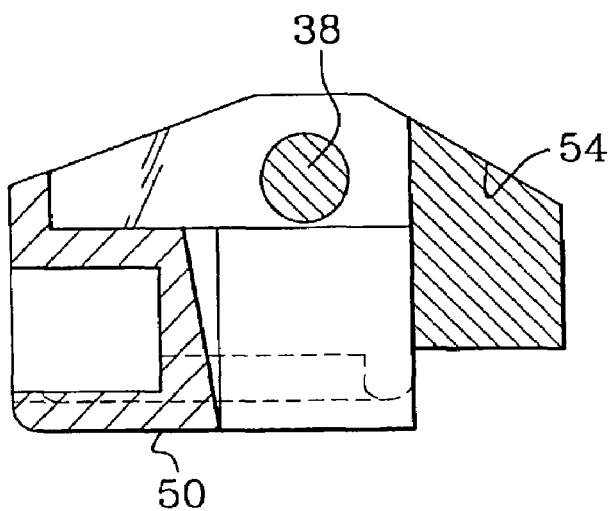

The shoe is then returned to its initial position with a swinging movement beyond the transition zone, to return the working surface 50 to parallelism with the working plane, FIG. 3E. As soon as the shoe has left the thin layer support region, the layer can be treated for example by means of a laser and this treated thin layer is then retracted to receive if necessary a new layer under the same conditions as the preceding. Withdrawal takes place by lowering the support 36, with precision. There is attained the result and the position of the parts of FIG. 3F.

The embodiment is simplified so as to explain it and to show the steps, but it can be improved. Thus, the modification with rails and guide lugs is of interest for possible application even in an aggressive or delicate environment such as a heated chamber, but it is possible in other circumstances to include motorization for pivoting and inclining. In this case, it is possible to vary with a stepping motor the angle of inclination in a precise manner and hence to provide a more adaptable device, more precise under certain circumstances and adapted to be controlled to ensure variations of inclination according to a suitable program.

The embodiment has been shown with a single passage, but there could also be envisaged variations of height with successive passages of a screed provided with adjustment means for the height of passage of the shoe.

In this case, during the first passage, the necessary volume for the final thin layer is driven and the length of applying the layer is reduced. It is not until fast passage that the layer reaches the desired thickness and the desired surface corresponding to the volume initially driven.

There could also be provided an assembly of two or more successive shoes adjusted as to different heights, constituting a same screed.

The process for applying a layer according to the invention which utilizes the device which has been described, leads to the determination of the cycles of layering as a function of the thickness of the layer to be produced, as a function of the granulometry of the powder to be used in the thin layer.

It is thus a matter of applying in a progressive manner the powder without giving rise to compacting and above all without altering the preceding layer.

Thus to provide a layer of 100 μm, it is necessary to carry out three passages with a powder of the order 10 to 20 μm.

To obtain this result, a diminishing law must preferably be used which is non-linear, of the type $y=(ax+b)/(cx+d)$.

The following example can be cited:

Values are given to the coefficients a, b, c and d, obtained by experiment, 4, 0, 3 and 3, from the machine utilized and the powder.

Compacting is started with an initial height of 500 μm and with the air to reach a final height of 100 μm:

$$y=(4\times0+0)/(3\times0+3)=0$$

$$y=(4\times1+0)/(3\times1+3)=0.666$$

$$y=(4\times2+0)/(3\times2+3)=0.888$$

$$y=(4\times3+0)/(3\times3+9)=1.00$$

Thus for x=3, which is to say the third passage after the initial deposit, namely 4 repetitions, there is obtained the final height imposed because the coefficient is 1.

It is thus possible to compute the number of passages necessary, as a function of the thickness of the layer and of the type of powder.

In FIGS. 4A, 4B, 4C and 4D, there is shown a preferred embodiment which comprises a screed with the same elements as schematically shown and which bear the same reference numerals.

For practical industrial considerations, a counterweight 54 is provided at the front of the shoe 36. There will also be noted a lug 44 of a particular shape with a surface 56 of suitable rounded profile, which permits repeated slanting and guiding without premature wear.

In the case of this embodiment of the screed, the angles of the indentations 54 should be carefully adjusted to permit excellent regularity of distribution of the powder.

In this case, the rollers are omitted in favor of surfaces sliding on the rails.

The invention claimed is:

1. A device for applying a thin layer of powder on support means (14) in a process for applying successive layers of a powder that are each several tens to several hundreds of microns thick, the device comprising:
   means (12) for storing said powder,
   means (16) for screeding said powder with a screed (30) comprising a shoe (36) with a working surface (50),
   means (28) for guiding said screed in translation along a direction of movement F,
   wherein the shoe (36) is movable in rotation and comprises means (32, 34) for inclining the shoe to at least two positions, the first position in which the working surface (50) is parallel to the support means (14) for the layers for engaging a predetermined volume of powder and the second position in which this working surface (50) is inclined at an angle α relative to said support means, and
   wherein said shoe is arranged and adapted to move while in said first position from said means (12) for storing said powder to said support means (14) with a front surface of said shoe pushing said powder towards said support means and wherein said shoe is arranged and adapted to incline to said second position from said first position upon reaching said support means to apply a thin layer of said powder on said support means.

2. The device for applying a thin layer according to claim 1, wherein the working surface (50) of the shoe (36) comprises an obstacle (52).

3. The device for applying a thin layer according to claim 2, wherein the obstacle comprises several indentations (54).

4. The device for applying a thin layer according to claim 3, wherein the indentations (54) are three in number and have a transverse triangular/rectangular cross-section with the right angle in the plane of the working surface (50) and to the rear with respect to the direction of movement F.

5. Device for applying a thin layer according to claim 1, characterized in that the inclining means are mechanical means.

6. The device for applying a thin layer according to claim 5, wherein the mechanical means comprise rails (34) having a height h over a length $L_1$, a transition length L and a height H over a length $L_2$ and lugs (44) bearing slidably on said rails.

7. Device for applying a thin layer according to claim 1, characterized in that the inclining means are motorized.

8. A device for applying a thin layer of powder on support means in a process for prototyping parts that applies successive layers of the powder, the device comprising:
   storage for the powder;
   a shoe having a front surface and a bottom working surface, said shoe being arranged and adapted to move from upstream of said storage to downstream of said support means while said shoe is in a first position in which said front surface pushes the powder from said storage to said support means, and said shoe being further arranged and adapted to rotate upon reaching said support means to a second position that is inclined at an angle relative to said first position and that spreads and compresses the powder between said working surface and a working plane.

9. The device of claim 8, wherein a leading edge of said shoe is above a trailing edge of said shoe when said shoe is in said second position.

10. The device of claim 9, wherein said shoe is arranged and adapted to free a sloped space between said working plane and said working surface when in said second position.

11. The device of claim 10, wherein a distance of said working plane from the trailing edge of said shoe in said second position is smaller than a distance of said working plane from the trailing edge of said shoe in said first position.

12. The device of claim 8, further comprising rails on which said shoe moves from upstream of said storage to downstream of said support means, and lugs on a front of said shoe that ride on said rails, said rails having a first height adjacent to said storage and a second height adjacent to said support means, wherein when said lugs are elevated to said second height said lugs pivot said shoe about an axel of said shoe to move said shoe to said second position.

13. A device for applying a layer of powder in a process for prototyping parts that applies successive layers of the powder, the device comprising:

two spaced apart rails that have a first height in a powder supply zone and a higher second height in a powder applying zone;

a screed that is movable from the supply zone to the applying zone, said screed having a shoe that is rotatable about an axel, said axel moving over said rails unaffected by a height of said rails; and lugs on a leading edge of said shoe, said lugs riding on said rails and causing said shoe to rotate about said axel when said lugs move from the first height to the second height, said shoe pushing powder from the supply zone when said lugs are at the first height and applying a layer of powder in the applying zone when said lugs are at the second height.

14. The device of claim 13, further comprising plural indentations that extend across a bottom working surface of said shoe generally perpendicular to said rails.

15. The device of claim 13, wherein said screed comprises rollers whose radius is at least as large as the second height.

* * * * *